(12) United States Patent
Groot

(10) Patent No.: US 6,359,692 B1
(45) Date of Patent: Mar. 19, 2002

(54) METHOD AND SYSTEM FOR PROFILING OBJECTS HAVING MULTIPLE REFLECTIVE SURFACES USING WAVELENGTH-TUNING PHASE-SHIFTING INTERFEROMETRY

(75) Inventor: Peter de Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 09/349,593

(22) Filed: Jul. 9, 1999

(51) Int. Cl.[7] .............................................. G01B 9/02
(52) U.S. Cl. ...................................................... 356/512
(58) Field of Search ................................. 356/359, 489, 356/495, 512, 513, 514

(56) References Cited

U.S. PATENT DOCUMENTS

| | | | |
|---|---|---|---|
| 4,594,003 A | 6/1986 | Sommargren | 356/359 |
| 5,452,088 A | 9/1995 | Ai | 356/359 |
| 5,473,434 A | 12/1995 | de Groot | 356/359 |
| 5,488,477 A | 1/1996 | de Groot | 356/359 |

OTHER PUBLICATIONS

Interferogram Analysis for Optical Testing, Malacara et al, 1998, pp 275–277.*
Okada et al., "Separate Measurements of Surface Shapes and Refractive Index Inhomogeneity of an Optical Element Using Tunable–source Phase Shifting Interferometry," *Applied Optics*, 29:3280–3285, Aug. 1, 1990.
Freischlad, "Fourier Analysis of Phase Shifting Algorithms," *Proceedings of SPIE*, 3407:73–85, Jun. 8–11, 1998.
Schwider, "White–Light Fizeau Interferometer," *Applied Optics*, 36:1433–1437, Mar. 1, 1997.
Schwider et al., "Digital Wave–front Measuring Interferometry: Some Systematic Error Sources," *Applied Optics*, 22:3421–3432, Nov. 1, 1983.
Freischald, "Large Flat Panel Profiler," *Proceedings SPIE*, 2862:163–171, Aug. 8–9, 1996.

* cited by examiner

Primary Examiner—Samuel A. Turner
(74) Attorney, Agent, or Firm—Fish & Richardson P.C.

(57) ABSTRACT

The invention features methods and systems for interferometrically profiling a measurement object having multiple reflective surfaces, e.g., to profile a selected one of the multiple reflective surfaces. The methods and systems involve: positioning the measurement object within an unequal path length interferometer (e.g., a Fizeau interferometer) employing a tunable coherent light source; recording an optical interference image for each of multiple wavelengths of the light source, each image including a superposition of multiple interference patterns produced by pairs of wavefronts reflected from the multiple surfaces of the measurement object and a reference surface; and extracting phases of a selected one of the interference patterns from the recorded images by using a phase-shifting algorithm that is more sensitive (e.g., at least ten times more sensitive) to a wavelength-dependent variation in the recorded images caused by the selected interference pattern than to wavelength-dependent variations in the recorded images caused by the other interference patterns.

24 Claims, 3 Drawing Sheets

METHOD AND SYSTEM FOR PROFILING OBJECTS HAVING MULTIPLE REFLECTIVE SURFACES USING WAVELENGTH-TUNING PHASE-SHIFTING INTERFEROMETRY

BACKGROUND OF THE INVENTION

The invention relates to a wavelength-tuning, phase-shifting interferometry.

Interferometric optical techniques are widely used to measure optical thickness, flatness, and other geometric and refractive index properties of precision optical components such as glass substrates used in lithographic photomasks.

For example, to measure the surface profile of a measurement surface, one can use an interferometer to combine a measurement wavefront reflected from the measurement surface with a reference wavefront reflected from a reference surface to form an optical interference pattern. Spatial variations in the intensity profile of the optical interference pattern correspond to phase differences between the combined measurement and reference wavefronts caused by variations in the profile of the measurement surface relative to the reference surface. Phase-shifting interferometry (PSI) can be used to accurately determine the phase differences and the corresponding profile of the measurement surface.

With PSI, the optical interference pattern is recorded for each of multiple phase-shifts between the reference and measurement wavefronts to produce a series of optical interference patterns that span a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase-offset equal to the phase difference between the combined measurement and reference wavefronts for that spatial location. Using numerical techniques known in the art, the phase-offset for each spatial location is extracted from the sinusoidal dependence of the intensity values to provide a profile of the measurement surface relative the reference surface. Such numerical techniques are generally referred to as phase-shifting algorithms.

The phase-shifts in PSI can be produced by changing the optical path length from the measurement surface to the interferometer relative to the optical path length from the reference surface to the interferometer. For example, the reference surface can be moved relative to the measurement surface. Alternatively, the phase-shifts can be introduced for a constant, non-zero optical path difference by changing the wavelength of the measurement and reference wavefronts. The latter application is known as wavelength tuning PSI and is described, e.g., in U.S. Pat. No. 4,594,003 to G. E. Sommargren.

Unfortunately, PSI measurements can be complicated by spurious reflections from other surfaces of the measurement object because they too contribute to the optical interference. In such cases, the net optical interference image is a superposition of multiple interference pattern s produced by pairs of wavefronts reflected from the multiple surfaces of the measurement object and the reference surface.

SUMMARY OF THE INVENTION

The invention features a method for extracting selected interference data from overlapping optical interference patterns arising from spurious reflections. The method takes advantage of the fact that for each interference pattern, a change in optical wavelength induces a phase-shift that is substantially linearly proportional to the optical path difference (OPD) corresponding to the two wavefronts giving rise to the interference pattern. In other words, the intensity profile of each interference pattern has a sinusoidal dependence on wavelength, and that sinusoidal dependence has a phase-shifting frequency proportional to the OPD for that interference pattern. To extract the phase-information of the interference pattern of interest, the method employs a phase-shifting algorithm that is more sensitive to the phase-shifting frequency of the selected interference pattern than to those of the other interference patterns in the image.

In general, in one aspect, the invention features a method for interferometrically profiling a measurement object having multiple reflective surfaces. The method includes: positioning the measurement object within an unequal path length interferometer (e.g., a Fizeau interferometer) employing a tunable coherent light source; recording an optical interference image for each of multiple wavelengths of the light source, each image including a superposition of multiple interference patterns produced by pairs of wavefronts reflected from the multiple surfaces of the measurement object and a reference surface; and extracting phases of a selected one of the interference patterns from the recorded images by using a phase-shifting algorithm that is more sensitive (e.g., at least ten times more sensitive) to a wavelength-dependent variation in the recorded images caused by the selected interference pattern than to wavelength-dependent variations in the recorded images caused by the other interference patterns.

Embodiments of the profiling method can include any of the following features. The phase-shifting algorithm can include a phase calculation equal to an arctangent of a ratio, the numerator and denominator of the ratio being weighted sums of intensity values of the recorded images at each spatial coordinate. More specifically, the phase-shifting algorithm can be a Fourier-series phase-shifting algorithm. The multiple wavelengths can be spaced from one another to impart substantially equal phase-shifts between the selected interference patterns in consecutive images. Furthermore, the multiple wavelengths can be spaced from one another to impart an absolute phase-shift of less than $2\pi$ between the selected interference patterns in consecutive images. Alternatively, the multiple wavelengths can be spaced from one another to impart an absolute phase-shift of greater than $2\pi$ between the selected interference patterns in consecutive images (i.e., sub-Nyquist sampling).

In general, in another aspect, the invention features a method for interferometrically profiling a measurement object having multiple reflective surfaces. The method includes: positioning the measurement object within an unequal path length interferometer employing a tunable coherent light source; recording an optical interference image for each of multiple wavelengths of the light source, each image including a superposition of multiple interference patterns produced by pairs of wavefronts reflected from the multiple surfaces of the measurement object and a reference surface; and extracting phases of a selected one of the interference patterns from the recorded images by using a Fourier-series phase-shifting algorithm.

The Fourier-series phase-shifting algorithm can include a phase calculation equal to an arctangent of a ratio, the numerator and denominator of the ratio being weighted sums of intensity values of the recorded optical interference patterns at each spatial coordinate. For example, the phase calculation can corresponds to:

$$\tan(\theta) =$$

$$\frac{-3(g_0 - g_{12}) - 4(g_1 - g_{11}) + 12(g_3 - g_9) + 21(g_4 - g_8) + 16(g_5 - g_7)}{-4(g_1 + g_{11}) - 12(g_2 + g_3 + g_9 + g_{10}) + 16(g_5 + g_7) + 24g_6}$$

where for each spatial coordinate, $\theta$ is the phase extracted by the algorithm and $g_j$ is the intensity value of the "$j^{th}$" image, and where the wavelength shift $\Delta\lambda$ between consecutive patterns corresponds to a phase shift substantially equal to $\pi/4$ for the selected interference pattern.

In general, in a further aspect, the invention features a system for profiling a measurement object having multiple reflective surfaces including a tunable coherent light source, an unequal length interferometer (e.g., a Fizeau interferometer), a detector, and a system controller. The light source is configured to generate light at any one of multiple wavelengths. The interferometer includes a mount configured to position a selected one of the reflective surfaces of the measurement object at a non-zero distance Z from the zero optical path difference (OPD) position of the interferometer. The distance Z is less than about nT/2, nT being the smallest optical distance between two of the multiple reflective surfaces of the measurement object. The interferometer is also configured to receive the light from light source and generate an optical interference image including a superposition of multiple interference patterns produced by pairs of wavefronts reflected from the multiple surfaces of the measurement object and a reference surface. The detector is configured to record the optical interference image generated by the interferometer. The system controller is connected to the light source and the detector. During operation it causes the light source to generate light at each of the multiple wavelengths, causes the detector to record the image for each of the multiple wavelengths of the light source, and implements a phase-shifting algorithm to determine phases of a selected one of the interference patterns from the recorded images.

Embodiments of the profiling system can have any of the following features. The distance Z can satisfy the expression nT/2≧Z≧nT/5, for example Z can be equal to about nT/3. The phase-shifting algorithm implemented by the controller can be more sensitive to a wavelength-dependent variation in the recorded images caused by the selected interference pattern than to wavelength-dependent variations in the recorded images caused by the other interference patterns. The phase-shifting algorithm implemented by the controller can be a Fourier-series phase-shifting algorithm.

In general, in a further aspect, the invention features a system for profiling a measurement object having multiple reflective surfaces including: including a tunable coherent light source, an unequal length interferometer (e.g., a Fizeau interferometer), a detector, and a system controller. The tunable coherent light source is configured to generate light at any one of multiple wavelengths spanning a range greater than or equal to about $\lambda^2/nT$, where $\lambda$ is an intermediate one of the multiple wavelengths and nT is the smallest optical distance between two of the multiple reflective surfaces of the measurement object. The interferometer is configured to support the measurement object, receive the light from light source, and generate an optical interference image including a superposition of multiple interference patterns produced by pairs of wavefronts reflected from the multiple surfaces of the measurement object and a reference surface. The detector is configured to record the optical interference image generated by the interferometer. The system controller is connected to the light source and the detector. During operation it causes the light source to generate light at each of the multiple wavelengths, causes the detector to record the optical interference image for each of the multiple wavelengths of the light source, and implements a phase-shifting algorithm to determine phases of a selected one of the interference patterns from the recorded images.

Embodiments of the profiling system can include any of the following features. The wavelengths can span a range greater than or equal to about $3\lambda^2/2\,nT$, e.g., about $5\lambda^2/2\,nT$. The tunable coherent source can include a laser diode and a driver, which during operation adjusts the current to the laser diode to vary wavelength output of the laser diode. The phase-shifting algorithm implemented by the controller can be more sensitive to a wavelength-dependent variation in the recorded images caused by the selected interference pattern than to wavelength-dependent variations in the recorded images caused by the other interference patterns. The phase-shifting algorithm implemented by the controller can be a Fourier-series phase-shifting algorithm.

Embodiments of the invention have many advantages. For example, a selected reflective surface of a measurement object can be profiled even though other surfaces produce spurious reflections that complicate the optical interference image. As a result, precision optical substrates such as glass flats can be profiled without coating any of their surfaces. Moreover, the profiling measurements can be as fast and robust as in measurement involving no such spurious reflections. In addition to measuring the topography of a selected surface of the measurement object, the optical profile of the measurement object including refractive index inhomogeneities can also be measured.

Other aspects, advantages, and features will be apparent from the following detailed description and from the claims.

DETAILED DESCRIPTION

The invention features methods and systems that separate overlapping interference pattern s (i.e., fringe patterns) by PSI, using optical wavelength modulation in an unequal path interferometer (e.g., a Fizeau interferometer) to generate the required phase shifts. A change in optical wavelength induces a corresponding change in interference phase that is linearly proportional to the optical path difference (OPD). Thus, multiple reflective surfaces of a measurement object will give rise to interference patterns that have different phase shifts for the same change in optical wavelength. The methods and systems position the measurement object so that the interference modulations produced by reflections from surfaces not of interest are pushed into a frequency band that is rejected by the PSI algorithm. Thus, the PSI algorithm automatically determines the phase profile of the interference pattern of interest. One embodiment of the invention is an optical interferometry system that determines the height profile of an object surface in the presence of unwanted or spurious reflections from secondary surfaces, as for example may be present with plane-parallel transparent objects.

Figure 1:
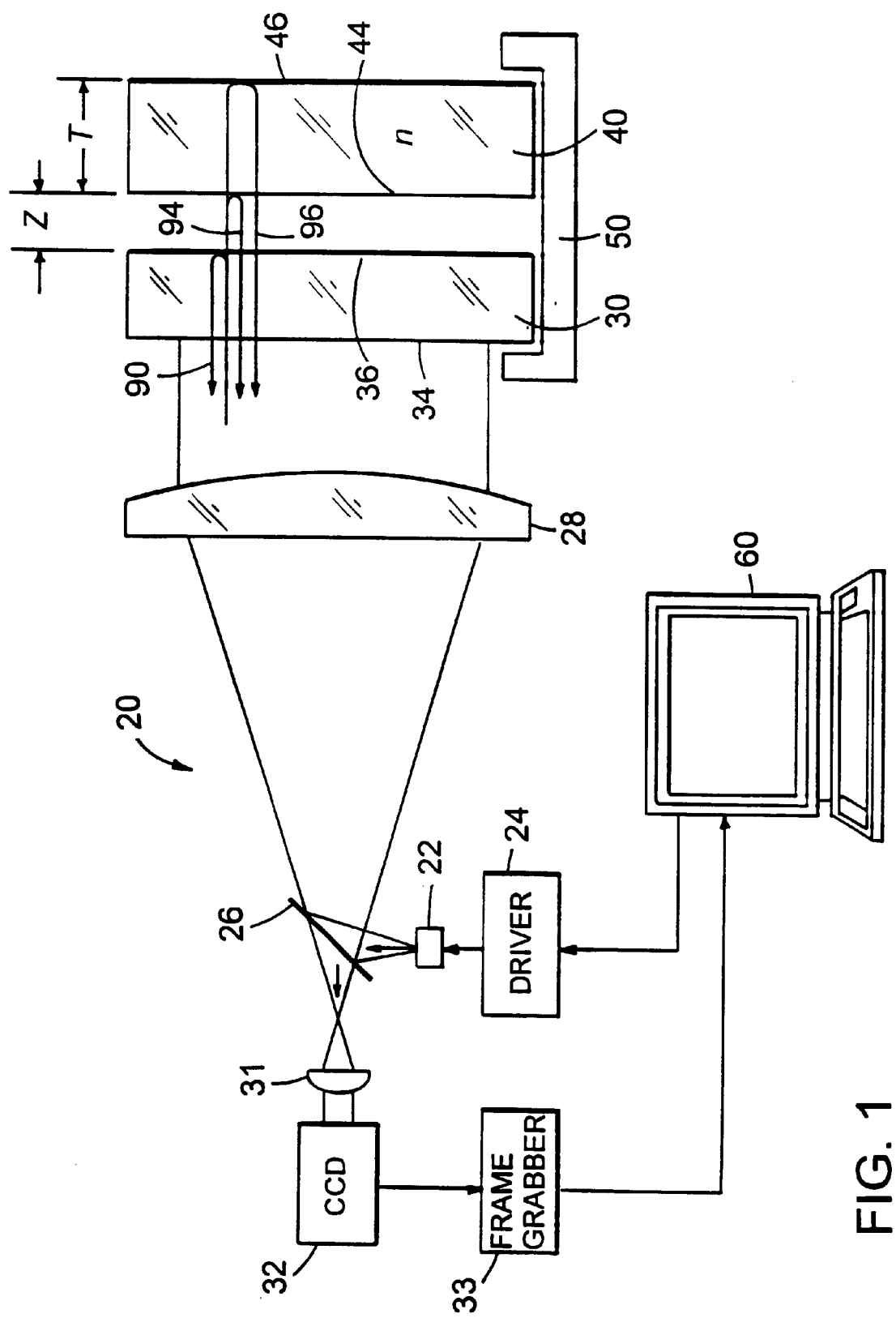
FIG. 1 is a schematic diagram of one embodiment of the phase-shifting interferometry system.

A schematic diagram of such a system 10 is shown in FIG. 1. System 10 is adapted to measure the profile of a front surface 44 of a transparent measurement object 40 in the presence of unwanted reflections from a back surface 46 of object 40. System 10 includes a Fizeau interferometer 20, a mount 50 for positioning measurement object 40 relative to interferometer 20, and a controller 60 such as a computer. Interferometer 20 includes a tunable light source 22 (e.g., a laser diode), a driver 24 connected to light source 22 for adjusting the wavelength of its output, a beam splitter 26, a collimating optic 28, a reference flat 30, an imaging optic 31, a CCD camera 32, and a frame grabber 33 for storing images detected by camera 32. Driver 24 adjusts the wavelength $\lambda$ of light source 24 by an amount $\Delta\lambda$ about a nominal wavelength of $\lambda_0$, i.e., $\lambda=\lambda_0+\Delta\lambda$, where $\Delta\lambda<<\lambda$. The back surface of reference flat 30 defines a reflective reference surface 36 for the interferometer, whereas a front surface 34 of reference flat 30 has an antireflection coating and may be additionally or alternatively tilted with respect to back surface 36, so that reflections from front surface 34 do not take part in any subsequent measurements.

Measurement object 40 includes reflective front and back surfaces 44 and 46, respectively, and has a thickness T and a refractive index n. The distance between reference surface 36 of and back surface 46 of measurement object 40 is Z. During operation, controller 60 causes driver 24 to control the wavelength of light emitted by light source 22 and causes frame grabber 33 to store an image of the optical interference detected by CCD camera 32 for each of the specified wavelengths. Frame grabber 33 sends the images to controller 60, which analyzes them using a PSI algorithm. In the presently described embodiment, driver 24 linearly modulates the frequency of the light emitted by light source 22 as the series of interference images are being recorded. Alternatively, in other embodiments, the driver can modulate the light frequency in discrete steps or according to other functions.

During operation, light source 22 directs light at a wavelength $\lambda$ to beam splitter 26, which then directs the light to collimating lens 28 to collimate the light into a plane field. Reference surface 36 reflects a first portion of the light to form a reference wavefront 90, and surfaces 44 and 46 of measurement object 40 reflect additional portions of the light to form a measurement wavefront 94 and an undesired wavefront 96, respectively. Lenses 28 and 31 then image wavefronts 90, 94, and 96 onto CCD camera 32 where they form an optical interference image.

Figure 2:
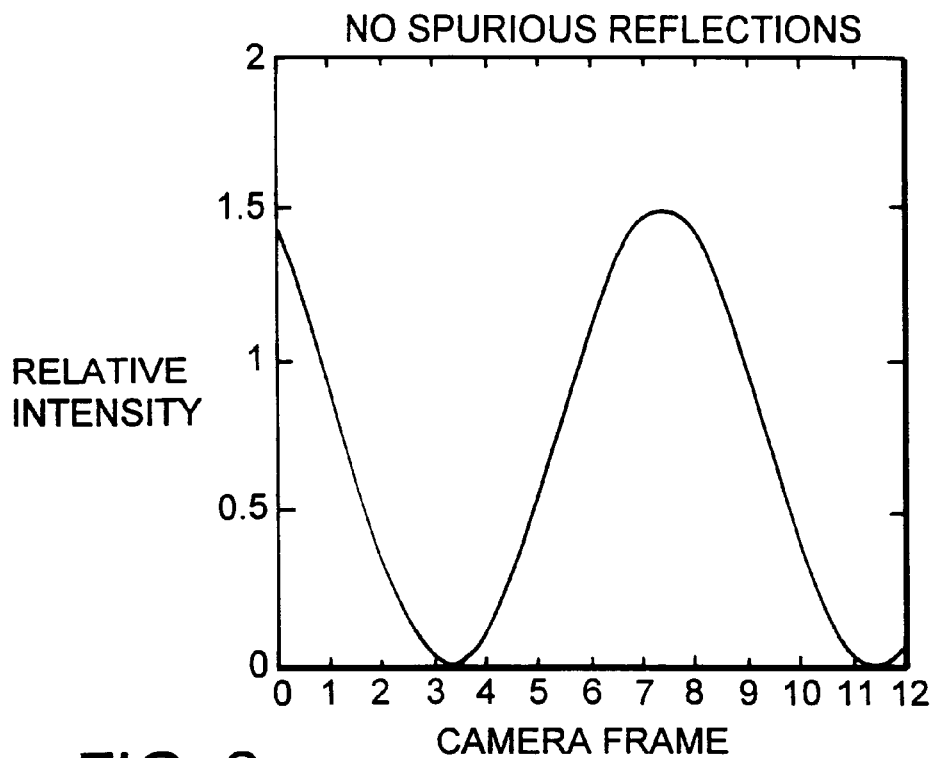
FIG. 2 is a plot of the intensity variation at a representative spatial location of the CCD camera of FIG. 1 for a series of wavelength-shifted images in the absence of any spurious reflections.

In the analysis that follows, we first ignore the contribution of undesired wavefront 96 to the interference image. In this case, the image includes only a single interference pattern formed by the interference of reference wavefront 90 and measurement wavefront 94. The OPD corresponding to this interference pattern is 2Z, which equals the round trip optical distance between the surfaces that give rise to reflected wavefronts 90 and 94. Thus, the intensity profile g(x,y) of the interference pattern can be expressed as:

$$g[\theta(x,y),t]=c_0+c_1\cos[\phi(t)-\theta(x,y)] \quad (1.)$$

where $$\phi(t) = v_0 t + \zeta, \quad (2.)$$

$$v_0 = \alpha_0 / \Delta t, \quad (3.)$$

$$\alpha_0 = 4\pi \frac{\Delta\lambda}{\lambda_0^2} Z, \quad (4.)$$

where $c_0$ and $c_1$ are constants that depend on the reflectivities of the surfaces, $\zeta$ is a constant phase offset which will be set to zero, $v_0$ is the fundamental modulation frequency, $\Delta\lambda$ is a wavelength shift taking place over a time interval $\Delta t$ between succesive image frames captured by CCD camera 32, $\alpha_0$ is the resultant fundamental phase shift between frames, and $\theta(x,y)$ is the phase profile corresponding to the height profile h(x,y) of object surface 44 relative to reference surface 36. To determine $\theta(x,y)$, controller 60 analyzes multiple images of g(x,y) corresponding to multiple wavelength shifts $\Delta\lambda$ with respect to a nominal wavelength $\lambda_0$. Thus, the intensity values of the interference patterns at each spatial coordinate (x,y) vary sinusoidally from image to image, as shown, for example, in FIG. 2 for a representative spatial coordinate and assuming equal wavelength shifts $\Delta\lambda$ from image to image.

For each spatial coordinate (x,y) controller 60 employs a PSI algorithm to extract the phase-offset for the sinusoidally varying intensity values. Together, the phase-offsets provide the phase profile $\theta(x,y)$. Assuming that reference surface 36 is perfectly flat, the phase profile $\theta(x,y)$ gives the surface profile h(x,y) of measurement surface 44 according to the expression $\theta(x,y)=4\pi h(x,y)/\lambda_0$.

The central task of PSI is to estimate the interference phase $\theta$ by inspection of the time-dependent periodic signal $g(\theta,t)$. Phase-shifing algorithms ("PSI algorithms") for performing this task are known in the art, see, e.g., Daniel Malacara, editor, *Optical Shop Testing* (2nd Ed.), Chapter 14, p. 501 (Wiley, N.Y., 1992). Particularly common are Fourier-series PSI algorithms, see, e.g., P. de Groot, "Derivation of algorithms for phase-shifting interferometry using the concept of a data-sampling window", Applied Optics 34(22), 4723–4730 (1995) Fourier-series PSI algorithms are essentially single-frequency Fourier transforms of intensity data, where typically these data are acquired at uniformly spaced phase shift intervals.

What follows is a detailed description of the theory and construction of Fourier series PSI algorithms. Since the intensity signal $g(\theta,t)$ is periodic (e.g. sinusoidal), one way to determine the phase $\theta$ is to transform the signal $g(\theta,t)$ into the frequency domain:

$$G(\theta, v) = \int_{-\infty}^{\infty} g(\theta, t)w(t)\exp(-i2\pi vt)dt. \quad (5.)$$

The phase $\theta$ may then be extracted by comparing the imaginary and real parts of the strongest coefficient $G(\theta,v)$ in the frequency-domain representation of the interference signal. The window function w(t) is included to reduce problems associated with finite observation intervals, and v is modulation frequency. If the intensity signal $g(\theta,t)$ is expected to have a desired fundamental modulation frequency $v_0$, as in, e.g., Eq.(3), $G(\theta,v)$ from Eq.(5) can be expressed as:

$$G(\theta,v)=Q\{W(v)+\tfrac{1}{2}V[W(v-v_0)\exp(i\theta)+W(v+v_0)\exp(-i\theta)]\} \quad (6.)$$

where W(v) is the Fourier Transform of the window function $w(v_0)$. The window is normally constructed so that $$W(v_0)=0 \tag{7.}$$

$$W(2v_0)=0 \tag{8.}$$

so that $$\theta=\tan^{-1}(R)+\text{const.} \tag{9.}$$

where $$R = \frac{\text{Im}\{G(\theta, v_0)\}}{\text{Re}\{G(\theta, v_0)\}} \tag{10.}$$

and the constant is the complex phase of the transformed window at v=0. Suitable window functions include square windows, triangular windows, and raised cosine (i.e., Von Hanning) windows.

In practice, PSI usually involves an approximation of discrete sampling based on a sequence of several integrated intensity values. In a surface-measuring instrument such as the present embodiment, each intensity sampling j corresponds to a frame of camera data. For the discrete case, there are a series of accumulated phase shifts $\phi_j$ spaced by equal increments $\alpha_0$ between frames, so that Eq.(2) becomes $$\phi_j=(j-j_0)\alpha_0 \tag{11.}$$

where $j_0$ is a starting offset chosen for example to make accumulated phase shifts $\phi_j$ symmetric about zero. The Fourier Transform of the discretely sampled intensity is $$G(\theta, v_0) = \sum_j g_j w_j \exp(-i\phi_j) \tag{12.}$$

where $g_j$ is the intensity signal for the "$j^{th}$" frame. The phase of the intensity signal is then given by Eq.(9) with $$R = \sum_j s_j g_j \bigg/ \sum_j c_j g_j \tag{13.}$$

where $$s_j=\text{Im}\{w_j \exp(-i\phi_j)\} \tag{14.}$$

$$c_j=\text{Re}\{w_j \exp(-i\phi_j)\} \tag{15.}$$

The calculation is equivalent to a single-frequency Fourier transform, designed to be sensitive to a specific fundamental modulation frequency $v_0$.

Contributions of undesired wavefront 96 reflected by the back surface of the measurement object surface 46, however, complicate the optical interference image. With the presence of undesired wavefront 96, the optical interference image now includes a superposition of three interference patterns: 1) the first interference pattern described above, formed by reference wavefront 90 and measurement wavefront 94, and corresponding to an OPD of 2Z; 2) a second interference pattern formed by measurement wavefront 94 and undesired wavefront 96, corresponding to an OPD of 2 nT; and 3) a third interference pattern formed by reference wavefront 90 and undesired wavefront 96, corresponding to an OPD of 2(Z+nT). Thus, the intensity values of the interference patterns at each spatial location (x,y) include multiple sinusoidal dependencies on the wavelength shifts.

The relative frequencies of the multiple sinusoidal dependencies depend on the OPD according to $$v=v_0\text{OPD}/2Z \tag{16.}$$

Thus for the second interference pattern, the modulation frequency is $$v=v_0 nT/Z \tag{17.}$$

and for the third interference pattern $$v=v_0(Z+nT)/Z \tag{18.}$$

For example, if measurement object 40 is positioned according to Z=nT/3, the first interference pattern contributes to the intensity values with a frequency of $v_0$ and the second and third interference patterns contribute to the intensity values at the third harmonic $3v_0$ and fourth harmonic $4v_0$ of that frequency, respectively. The resulting intensity values for consecutive images at a representative spatial location is shown in FIG. 3, where the fundamental phase shift between successive frames is $\alpha_0=\pi/4$ for the first (desired) interference pattern.

Figure 3:
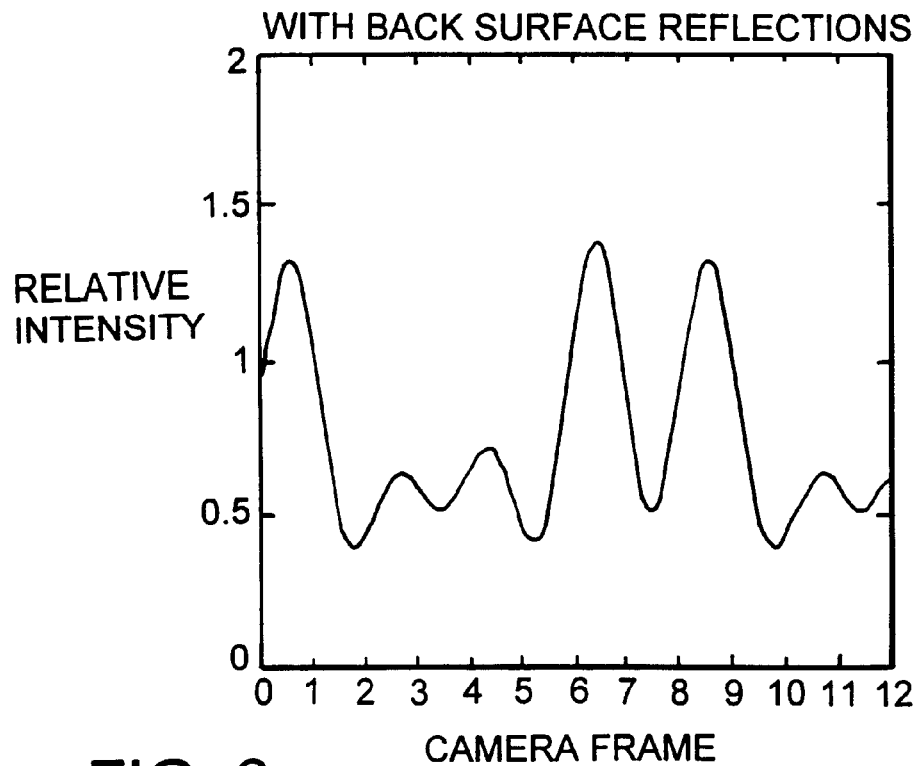
FIG. 3 is a plot of the intensity variation at a representative spatial location of the CCD camera of FIG. 1 for a series of wavelength-shifted images in the presence of a reflection from the back surface of the measurement object.

As shown in FIG. 3, the intensity values for consecutive images no longer have a well-defined sinusoidal variation. However, Fourier-series PSI algorithms can be designed to have minimum sensitivity to unwanted modulation frequencies by chosing particular window functions $w(v_0)$ and phase shift intervals $\alpha_0$ between image frames. Such PSI algorithms can suppress the contributions of the spurious interference patterns (the second and third interference patterns in this case) and determine the phase offset corresponding to the selected interference pattern.

One such PSI algorithm is the following thirteen-frame algorithm (hereinafter referred to as the "thirteen-frame algorithm"):

$$\tan(\theta) = \frac{-3(g_0-g_{12})-4(g_1-g_{11})+12(g_3-g_9)+21(g_4-g_8)+16(g_5-g_7)}{-4(g_1+g_{11})-12(g_2+g_3+g_9+g_{10})+16(g_5+g_7)+24g_6} \tag{19.}$$

where for each spatial coordinate (x,y), $\theta$ is the phase determined by the PSI algorithm and $g_j$ is the intensity value of the "$j^{th}$" image, and where the wavelength shift $\Delta\lambda$ between consecutive images corresponds to a phase shift for the frequency of interest substantially equal to $\alpha_0=\pi/4$. In the present example, by inversion of Eq.(4) and recalling that Z=nT/3, that wavelength shift $\Delta\lambda$ would be $$\Delta\lambda=3\lambda_0^2/16nT \tag{20.}$$

and the fundamental frequency $v_0$ would correspond to the first interference pattern. The thirteen-frame is described in U.S. Pat. No. 5,473,434 to Peter de Groot, the contents of which is incorporated herein by reference.

Figure 4:
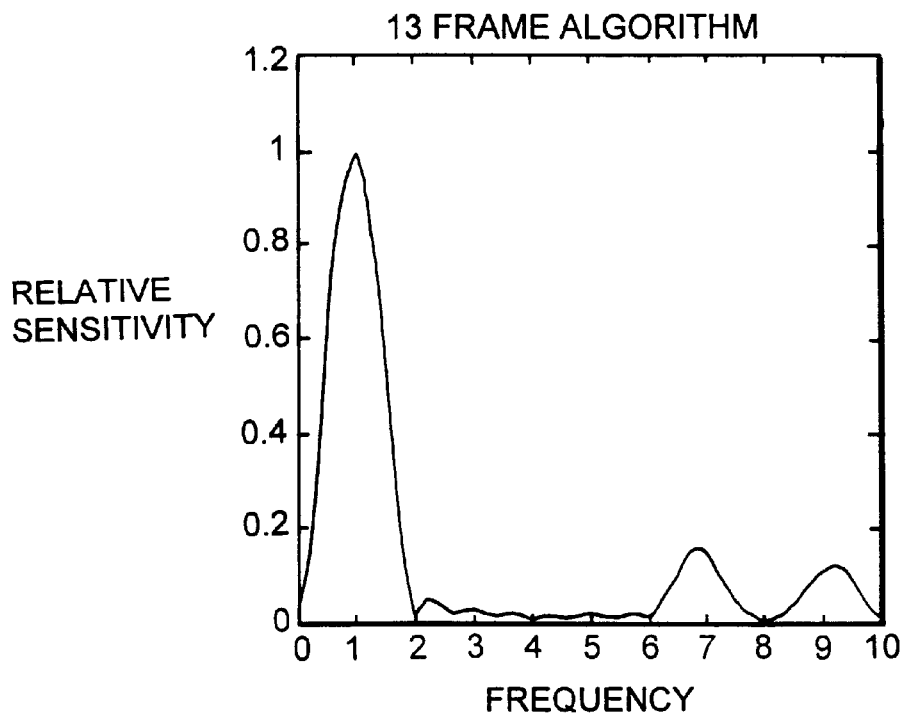
FIG. 4 is a plot of the sensitivity of the thirteen-frame PSI algorithm to intensity variations at different phase-shifting frequencies, normalized to a desired fundamental frequency. The frequencies are expressed as harmonics of the fundamental frequency.

The thirteen-frame algorithm is substantially insensitive to frequencies in the intensity data at the third and fourth harmonic of the frequency of interest. FIG. 4 illustrates the sensitivity of the thirteen-frame algorithm to intensity variations as a function of the frequency of the variation. The results are normalized to the sensitivity of the desired fundamental frequency and the frequencies are expressed in harmonics of the fundamental frequency $v_0$. As shown in FIG. 4, the thirteen-frame algorithm is substantially more sensitive to intensity variations at the fundamental frequency than at other frequencies, e.g., the third and fourth harmonics $3v_0$ and $4v_0$. The results in FIG. 4 incorporate the effect of integrated data acquisition during each frame.

Figure 5:
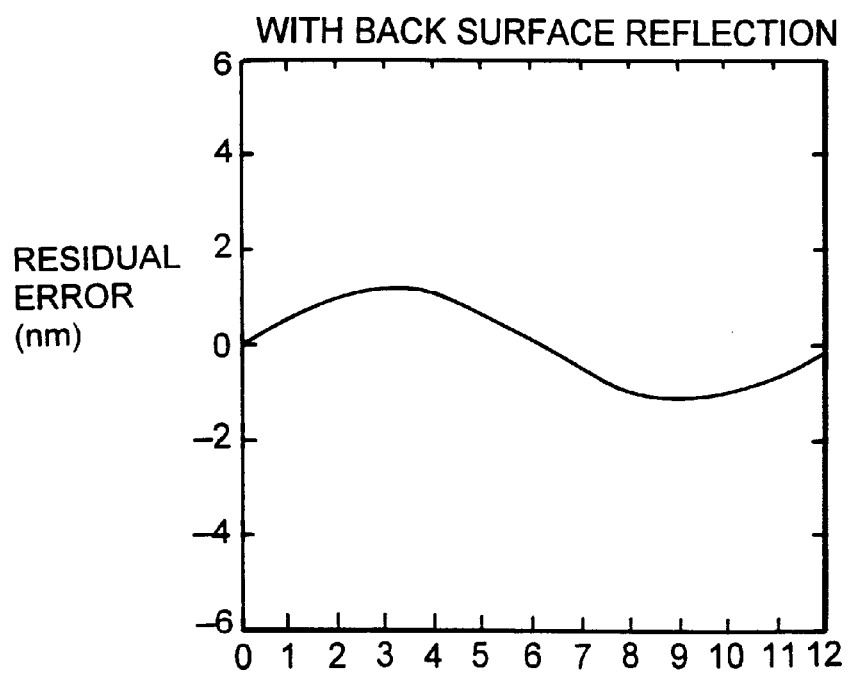
FIG. 5 is a plot of the residual error in the phase profile extracted by the thirteen-frame algorithm for the intensity values shown in FIG. 3.

Therefore, in the presently described embodiment, measurement object 40 is positioned from interferometer 20 according to Z=nT/3, and controller 60 causes driver 24 to adjust the wavelength of light source 22 in increments of $\Delta\lambda$ as given in Eq.(20) and employs the thirteen-frame algorithm to extract the phase-offset from each spatial coordinate of the wavelength-shifted images of the interference pattern. The algorithm suppresses the contributions of the second and third interference patterns to the interference image in favor of the first interference pattern, whose phase-shifting frequency is at the peak of the sensitivity curve of the thirteen-frame algorithm. Thus, the phase offset at every spatial coordinate provides, substantially, the phase profile $\Phi(x,y)$ of the first interference pattern, which, as described above, is indicative of the measurement surface 44, the surface of interest. For example, FIG. 5 illustrates the residual error in the phase profile extracted by the thirteen-frame algorithm for the intensity values shown in FIG. 3. The simulation is based on the light wavelength being nominally equal to 680 nm, and FIG. 5 expresses the residual error as being less than 2 nm at its peak value, which less than $\frac{1}{200}$ wave.

Other embodiments can employ PSI algorithms different from the thirteen-frame algorithm, provided that the PSI algorithm is relatively insensitive to phase-shifting frequencies corresponding to unwanted interference patterns in the optical image. For example, the PSI algorithm can be different from a Fourier-series PSI algorithm, and/or can be of the "point sample", "integrating bucket" or "sub Nyquist" type, see, e.g., Malacara, ibid. The frequency sensitivity for any PSI algorithm can be determined by numerical simulation, or by analytical calculation. For example, the analytical calculation of sensitivity $X(v)$ of a Fourier-series PSI algorithm as a function of frequency $v$ follows from Fourier transform theory, and is given by $$X(v) = \frac{1}{2}\sqrt{|F_S(v,\beta)|^2 + |F_C(v,\beta)|^2} \qquad (21.)$$

where $$F_S(v) = H_S(v)B(v) \qquad (22.)$$

$$F_C(v) = H_S(v)B(v) \qquad (23.)$$

$$H_S(v) = \frac{1}{q}\sum_j s_j \exp(-i\phi_j v) \qquad (24.)$$

$$H_C(v) = \frac{1}{q}\sum_j c_j \exp(-i\phi_j v) \qquad (25.)$$

$$q = \sum_j s_j \sin(-\phi_j) = \sum_j c_j \cos(\phi_j) \qquad (26.)$$

$$B(v) = \sin(v\alpha_0/2)/(v\sin(\alpha_0/2)) \qquad (27.)$$

$B(v)$ introduces the effect of integrating over one frame. The sensitivity of the thirteen-frame algorithm illustrated in FIG. 4 was determined using this analytical calculation. Other techniques for deterministic construction of appropriate PSI algorithms are described, e.g., by Y. Surrel in "Design of algorithms for phase measurements by the use of phase stepping," Appl. Opt. 35, 51–60 (1996).

Once the relative sensitivity of a given PSI algorithm is determined, the measurement object can be positioned so that the OPD corresponding to the interference pattern of interest produces a phase-shifting frequency within a sensitivity band of the PSI algorithm and the OPDs of the interference patterns to be suppressed produce phase-shifting frequencies outside the sensitivity bands of the PSI algorithm, as in the above example. For example, suitable PSI algorithms can include those that are at least ten times more sensitive to the phase-shifting frequency of the interference pattern of interest than to the frequencies of undesired interference patterns.

In some embodiments, the PSI algorithm will be more sensitive to a fundamental frequency than to harmonics of that fundamental frequency, such as with the thirteen-frame algorithm. In such embodiments, the OPD for the selected interference pattern should be smaller than that of any other interference pattern. In embodiments similar to that of FIG. 1, this condition requires measurement surface 44 be positioned adjacent reference surface 36 to within less than the thickness of measurement object 40, or within less than the smallest separation between any two reflective surfaces in the measurement object for measurement objects having multiple layers. For example, when using the thirteen-frame PSI algorithm and the arrangement of FIG. 1, measurement object 40 can be positioned according to $nT/2 \geq Z \geq nT/5$. To properly position measurement object 40 relative to reference surface 36, system 10 also includes mount 50 configured to support measurement object 40 and position it at the distance Z from reference surface 36. Mount 50 is configured to permit small distances for Z, e.g., 2.5 mm or less for objects a few mm in thickness. To facilitate such distances, mount 50 typically does not protrude substantially beyond the front surface of measurement object 40 during use. In some embodiments, the positioning of mount 50 relative to reference surface 36 is under computer control by controller 60. Furthermore, mount 50 can include means for adjusting the angular orientations (e.g., tip, tilt, and axial positions).

In an alternative embodiment, the object may be placed further away, e.g. $Z' >> nT$, and the data may be acquired at a higher frequency. For example, in FIG. 4 there is shown a second sensitivity peak at $9v_0$ which is a suitable frequency for sub-Nyquist data acquisition. The wavelength shift $\Delta\lambda$ would be exactly the same as before, i.e. as given in Eq.(20), but measurement surface 44 would be placed at a distance $Z'=3 nT$ instead of $Z=nT/3$. The unwanted surface reflections are still suppressed. For this alternative "sub-Nyquist" embodiment, CCD camera 32 can include a shutter to reduce integration time for each frame, to thereby reduce dampening caused by integrating over a range of modulation frequencies. For example, it is this dampening effect that makes the calculated sensitivity at $9v_0$ smaller than at $v_0$ in FIG. 4. Alternatively, the driver can modulate the light wavelength discretely so that each frame is collected for substantially constant light frequency, in which case the shutter is not necessary to reduce the dampening. One advantage of such sub-Nyquist embodiments is that they permit larger working distances between the reference surface and the surface of interest.

The light source for the phase-shifting interferometry system can be a laser such as a gas, solid-state, tunable dye or semiconductor laser. The light source can also be a white-light source with a tunable narrow-band spectral filter. Furthermore, in some embodiments the light source can operate at multiple nominal wavelengths to resolve phase cycling ambiguities in the extracted phase profiles. For example, the light source could operate adjustably between the multiple lines of a HeNe, Argon or diode laser. Also, in some embodiments the light source can be coupled to the interferometer by an optical fiber. The wavelength tuning of the light source can be accomplish internal or external to the light source. For example, the cavity length of a laser light source can be thermally or by piezo-mechanically modulated, to adjust the wavelength of the laser output.

Similarly, the injection current to the gain medium of a laser light source can modulated to adjust the wavelength of the laser output. Alternatively, for example, the wavelength output of the light source can be adjusted externally by acousto-optic, electro-optic, or opto-mechanical modulation.

The total range and interval of the wavelength tuning depends on the particular PSI algorithm. The thirteen-frame algorithm, for example, collect images at thirteen wavelengths corresponding to intervals of $\alpha_0=\pi/4$ fundamental phase shift at the phase-shifting frequency of the interference pattern of interest. Other PSI algorithm can use, for example, intervals of $\alpha_0=\pi/2$ phase shift. More generally, the total range of wavelength tuning typically, although not necessarily, spans at least a $2\pi$ of accumulated phase shift at the phase-shifting frequency of the interference pattern of interest. For example, if the surface of interest is the front surface of the measurement object as in FIG. 1, Eq.(20) implies that the total tuning range $\Lambda$ for the thirteen-frame algorithm should be greater than or equal to the following limit:

$$\Lambda \approx 5\lambda_0^2/2nT \qquad (28.)$$

Assuming a nominal wavelength of 680 nm and a measurement object refractive index of 1.5, an approximate condition is $\Lambda>0.7$ nm or ~450 GHz of optical frequency range divided by the object thickness in mm. Thus, for a measurement object thickness of 5 mm, an approximate tuning range of about 90 GHz is suitable. Light sources having such a suitable tuning range can include laser diodes such as a distributed feedback (DFB) laser or a coupled cavity device, possibly with direct thermal tuning. Alternatively, the light source can include external cavity laser diodes, such as those available commercially from New Focus Corporation (Santa Clara, Calif.) under the brand names VORTEX™ or VELOCITY™, which provide tuning ranges of 80 GHz and 6500 GHz, respectively, at 680 nm.

Although phase-shifting system in FIG. 1 included a Fizeau interferometer, other embodiments can employ an interferometer of a different type such as Twyman Green, Mach Zehnder, Michelson, Fabry-Perot, and grazing-incidence or unbalanced Mirau. Furthermore, the interferometer can be a large aperture, microscope, or fiber optic sensor interferometer.

Also, the measurement object can take on many forms. For example, the measurement object can be an optical flat, a photomask, a flat-panel display, or a silicon wafer (which would involve infrared illumination). Furthermore, the measurement object can be a cemented optic or an air-spaced optical assembly. The measurement object can also be or include a spherical or aspherical dome, contact lens, meniscus lens, or spectacle lens. Typically, the measurement object is transparent or partially transparent at the wavelength of the light source. More generally, the measurement object is any structure, e.g., micromachined silicon, for which it is desirable to suppress optical information related some surface features while measuring optical information from others. The desired optical information can relate to the topography of a selected surface of the measurement object or to the optical profile including refractive index inhomogeneities of all or a selected portion of the measurement object.

In any of the embodiments described above, the controller can include hardware, software, or a combination of both to control the other components of the system and to analyze the phase-shifted images to extract the desired information about the measurement object. The analysis steps described above can be implemented in computer programs using standard programming techniques. Such programs are designed to execute on programmable computers each comprising a processor, a data storage system (including memory and/or storage elements), at least one input device, and least one output device, such as a display or printer. The program code is applied to input data (e.g., the phase-shifted images from the CCD camera) to perform the functions described herein and generate output information (e.g., the topography of a selected surface), which is applied to one or more output devices. Each such computer program can be implemented in a high-level procedural or object-oriented programming language, or an assembly or machine language. Furthermore, the language can be a compiled or interpreted language. Each such computer program can be stored on a computer readable storage medium (e.g., CD ROM or magnetic diskette) that when read by a computer can cause the processor in the computer to perform the analysis described herein. For example, MetroPro™ software available from Zygo Corporation (Middlefield, Conn.) implements the thirteen-frame algorithm when operating in the "High Res" phase processing mode.

Other aspects, advantages, and modifications are within the scope of the following claims.

What is claimed is:

1. A method for interferometrically profiling a transparent measurement object having multiple reflective surfaces, the method comprising:

positioning the measurement object within an unequal path length interferometer employing a tunable coherent light source and having a reference surface;

recording an optical interference image for each of multiple wavelengths of the light source, each image comprising a superposition of multiple interference patterns, each of which is produced by a pair of wavefronts reflected from a corresponding different one of the multiple surfaces of the measurement object and said reference surface; and extracting phases of a selected one of the multiple interference patterns from the recorded images by using a phase-shifting algorithm that is more sensitive to a wavelength-dependent variation in the recorded images caused by the selected interference pattern than to wavelength-dependent variations in the recorded images caused by the other of said multiple interference patterns.

2. The method of claim 1, wherein the phase-shifting algorithm is at least ten-times more sensitive to a wavelength-dependent variation in the recorded images caused by the selected interference pattern than to wavelength-dependent variations in the recorded images caused by the other interference patterns.

3. The method of claim 1, wherein the unequal path length interferometer is a Fizeau interferometer.

4. The method of claim 1, wherein the phase-shifting algorithm includes a phase calculation equal to an arctangent of a ratio, the numerator and denominator of the ratio being weighted sums of intensity values of the recorded images at each spatial coordinate.

5. The method of claim 1, wherein the multiple wavelengths are spaced from one another to impart an absolute phase-shift of less than $2\pi$ between the selected interference patterns in consecutive images.

6. The method of claim 1, wherein the multiple wavelengths are spaced from one another to impart an absolute phase-shift of greater than $2\pi$ between the selected interference patterns in consecutive images.

7. The method of claim 1, wherein the multiple wavelengths are spaced from one another to impart substantially equal phase-shifts between the selected interference patterns in consecutive images.

8. The method of claim 1, wherein the phase-shifting algorithm is a Fourier-series phase-shifting algorithm.

9. A method for interferometrically profiling a transparent measurement object having multiple reflective surfaces, the method comprising:

positioning the measurement object within an unequal path length interferometer employing a tunable coherent light source and having a reference surface;

recording an optical interference image for each of multiple wavelengths of the light source, each image comprising a superposition of multiple interference patterns each of which is produced by a pair of wavefronts reflected from a corresponding different one of the multiple surfaces of the measurement object and said reference surface;

extracting phases of a selected one of the multiple interference patterns from the recorded images by using a Fourier-series phase-shifting algorithm.

10. The method of claim 9, wherein the Fourier-series phase-shifting algorithm includes a phase calculation equal to an arctangent of a ratio, the numerator and denominator of the ratio being weighted sums of intensity values of the recorded optical interference patterns at each spatial coordinate.

11. The method of claim 10, wherein the phase calculation corresponds to:

$$\tan(\theta) = \frac{-3(g_0 - g_{12}) - 4(g_1 - g_{11}) + 12(g_3 - g_9) + 21(g_4 - g_8) + 16(g_5 - g_7)}{-4(g_1 + g_{11}) - 12(g_2 + g_3 + g_9 + g_{10}) + 16(g_5 + g_7) + 24g_6}$$

where for each spatial coordinate, $\theta$ is the phase extracted by the algorithm and $g_j$ is the intensity value of the "$j^{th}$" image, and where the wavelength shift $\Delta\lambda$ between consecutive patterns corresponds to a phase shift substantially equal to $\pi/4$ for the selected interference pattern.

12. A system for profiling a transparent measurement object having multiple reflective surfaces said system comprising:

a tunable coherent light source configured to generate light at any one of multiple wavelengths;

an unequal path length interferometer having a reference surface and comprising a mount configured to position a selected one of said multiple reflective surfaces of the measurement object at a non-zero distance Z from the zero optical path difference (OPD) position of the interferometer, wherein Z is less than about nT/2, nT being the smallest optical distance between two of the multiple reflective surfaces of the measurement object, and wherein the interferometer is configured to receive the light from the light source and generate an optical interference image comprising a superposition of multiple interference patterns, each of which is produced by a pair of wavefronts reflected from a corresponding different one of the multiple surfaces of the measurement object and said reference surface;

a detector configured to record the optical interference image generated by the interferometer; and a system controller connected to the light source and the detector and which during operation causes the light source to generate light at each of the multiple wavelengths, causes the detector to record the image for each of the multiple wavelengths of the light source, and implements a phase-shifting algorithm to determine phases of a selected one of the multiple interference patterns from the recorded images.

13. The system of claim 12, wherein Z is equal to about nT/3.

14. The system of claim 12, wherein Z satisfies $nT/2 \geq Z \geq nT/5$.

15. The system of claim 12, wherein the unequal path length interferometer is a Fizeau interferometer.

16. The system of claim 12, wherein the phase-shifting algorithm implemented by the controller is more sensitive to a wavelength-dependent variation in the recorded images caused by the selected interference pattern than to wavelength-dependent variations in the recorded images caused by the other interference patterns.

17. The system of claim 12, wherein the phase-shifting algorithm implemented by the controller is a Fourier-series phase-shifting algorithm.

18. A system for profiling a transparent measurement object having multiple reflective surfaces said system comprising:

a tunable coherent light source configured to generate light at any one of multiple wavelengths spanning a range greater than or equal to about $\lambda^2/nT$ where $\lambda$ is an intermediate one of the multiple wavelengths and nT is the smallest optical distance between two of the multiple reflective surfaces of the measurement object;

an unequal path length interferometer having a reference surface and configured to support the measurement object, receive the light from light source, and generate an optical interference image comprising a superposition of multiple interference patterns, each of which is produced by a pair of wavefronts reflected from a corresponding different one of the multiple surfaces of the measurement object and said reference surface;

a detector configured to record the optical interference image generated by the interferometer; and a system controller connected to the light source and the detector and which during operation causes the light source to generate light at each of the multiple wavelengths, causes the detector to record the optical interference image for each of the multiple wavelengths of the light source, and implements a phase-shifting algorithm to determine phases of a selected one of the multiple interference patterns from the recorded images.

19. The system of claim 18, wherein the wavelengths span a range greater than or equal to about $3\lambda^2/2$ nT.

20. The system of claim 18, wherein the wavelengths span a range equal to about $5\lambda^2/2$ nT.

21. The system of claim 18, wherein the unequal path length interferometer is a Fizeau interferometer.

22. The system of claim 18, wherein the tunable coherent source comprises a laser diode and a driver which during operation adjusts the current to the laser diode to vary wavelength output of the laser diode.

23. The system of claim 18, wherein the phase-shifting algorithm implemented by the controller is more sensitive to a wavelength-dependent variation in the recorded images caused by the selected interference pattern than to wavelength-dependent variations in the recorded images caused by the other interference patterns.

24. The system of claim 18, wherein the phase-shifting algorithm implemented by the controller is a Fourier-series phase-shifting algorithm.

* * * * *

UNITED STATES PATENT AND TRADEMARK OFFICE
CERTIFICATE OF CORRECTION

PATENT NO.    : 6,359,692 B1
DATED         : March 19, 2002
INVENTOR(S)   : Peter J. De Groot It is certified that error appears in the above-identified patent and that said Letters Patent is hereby corrected as shown below:

Column 13,
Line 15, after "patterns" insert -- , --
Line 44, after "surfaces" insert -- , --

Column 14,
Line 22, after "surfaces" insert -- , --

Signed and Sealed this

Second Day of September, 2003

JAMES E. ROGAN
*Director of the United States Patent and Trademark Office*